United States Patent [19]

Kida et al.

[11] Patent Number: 4,636,481
[45] Date of Patent: Jan. 13, 1987

[54] ZRB$_2$ COMPOSITE SINTERED MATERIAL

[75] Inventors: Otojiro Kida; Yutaka Segawa, both of Yokohama, Japan

[73] Assignee: Asahi Glass Company Ltd., Tokyo, Japan

[21] Appl. No.: 751,528

[22] Filed: Jul. 3, 1985

[30] Foreign Application Priority Data

| | | |
|---|---|---|
| Jul. 10, 1984 [JP] | Japan | 59-141401 |
| Sep. 4, 1984 [JP] | Japan | 59-183636 |
| Sep. 14, 1984 [JP] | Japan | 59-191816 |
| Sep. 18, 1984 [JP] | Japan | 59-193969 |

[51] Int. Cl.$^4$ .................. C04B 35/58; B24D 3/16
[52] U.S. Cl. ............................. 501/96; 501/92; 501/93; 501/98; 501/102; 51/309
[58] Field of Search ............ 501/96, 92, 93, 102, 501/98; 51/309

[56] References Cited

U.S. PATENT DOCUMENTS

| | | | |
|---|---|---|---|
| 2,814,566 | 11/1957 | Glaser | 501/96 X |
| 3,305,374 | 2/1967 | Murata et al. | 501/102 X |
| 3,325,300 | 6/1967 | Wise et al. | 501/96 |
| 3,705,112 | 12/1972 | Nienart | 501/96 X |
| 3,775,137 | 11/1973 | Clougherty | 501/92 |
| 4,008,183 | 2/1977 | Ishii et al. | 252/516 X |
| 4,029,000 | 6/1977 | Nakamura et al. | 501/96 X |
| 4,379,852 | 4/1983 | Watanabe et al. | 501/96 X |
| 4,528,121 | 7/1985 | Matsushita et al. | 252/516 |

*Primary Examiner*—William R. Dixon, Jr.
*Attorney, Agent, or Firm*—Oblon, Fisher, Spivak, McClelland, & Maier

[57] ABSTRACT

A ZrB$_2$ composite sintered material consisting essentially of at least 1% by weight of SiC, at least 1% by weight of B$_4$C, at most 15% by weight of TiC, at most 35% by weight of TiN, at most 40% by weight of AlN, the rest being substantially ZrB$_2$, provided that the total amount of SiC and B$_4$C is from 2 to 50% by weight.

18 Claims, No Drawings

$ZrB_2$ COMPOSITE SINTERED MATERIAL

The present invention relates to a $ZrB_2$ (zirconium diboride) composite sintered material.

In general, metal boride ceramics are characterized by a high melting point, high hardness, high strength and high corrosion resistance, and they have been used as materials for cutting tools or high temperature mechanical parts. Most of the ceramics practically used are made of titanium boride, and zirconium boride is practically scarcely employed.

$ZrB_2$ composite sintered materials of the present invention have excellent characteristics such as a high melting point, high strength, high corrosion resistance, high hardness, electric conductivity and oxidation resistance, and they are useful in a wide range of applications, e.g. as materials for high temperature corrosion resistant parts, mechanical parts, heating elements, electrodes or crucibles of induction furnaces.

$ZrB_2$ composite sintered materials have not practically been used very much, but various materials have been proposed, for example, in patents.

Namely, as sintering additives or as secondary components in $ZrB_2$ sintered materials such as composite materials, there have been known a silicide such as $MoSi_2$, a nitride such as TaN, HfN or BN, an oxide such as $ZrO_2$, a carbide such as SiC or $B_4C$, or various metals.

For instance, with respect to the silicide, Japanese Examined Patent Publication No. 6098/1963 discloses $ZrSi_2$, and U.S. Pat. No. 3,705,112 discloses $MoSi_2$. However, these Si compounds are likely to melt or decompose when sintered in a high temperature atmosphere, and tend to lead to a porous micro-structure with extraordinary grain-growth, whereby the bending strength and corrosion resistance will be insufficient in many cases, and no adequate oxidation resistance for use in air will be obtained by the use of these secondary components only, although some anti-oxidation effects can be expected from the $SiO_2$ surface layer.

With respect to the nitride, TaN disclosed in U.S. Pat. No. 3,305,374 is incorporated to $ZrB_2$ or $TiB_2$ as highly hard material, and used for tool materials or decorative materials. Although being excellent with high hardness and high strength, such a material is not adequate in the oxidation resistance, thermal shock resistance or corrosion resistance when used in a high temperature oxidizing atmosphere as material for high temperature corrosion resistant parts, heating elements, electrodes, or crucibles for induction furnaces.

With respect to the carbide, U.S. Pat. No. 3,775,137 discloses SiC, and U.S. Pat. No. 3,325,300 discloses $B_4C$ and SiC. No adequate oxidation resistance is obtainable by the addition of SiC only as disclosed in U.S. Pat. No. 3,775,137. Whereas, when $MoSi_2 + B_4C$ or $MoSi_2 + SiC + B_4C$ are added as disclosed in U.S. Pat. No. 3,325,300, $MoSi_2$ has a melting point lower than the sintering temperature, and is likely to melt or decompose, or facilitate the grain-growth during the sintering, whereby the micro-structure tends to be porous, and the densification can hardly be accomplished, and no adequate oxidation resistance will be obtained.

With respect to the oxide, Japanese Examined Patent Publication No. 38048/1972 discloses a composite with $ZrO_2$. However, such a composite is intended to obtain high strength and high toughness by the transformation-toughness of the tetragonal $ZrO_2$. When it is used in a high temperature oxidizing atmosphere, the high strength and high toughness tend to be lost due to the transformation of the tetragonal $ZrO_2$ to the monoclinic form, and the oxidation resistance and heat shock resistance are not adequate.

Further, Japanese Unexamined Patent Publication No. 31831/1972 and Japanese Examined Patent Publication No. 17502/1977 disclose that a sintered material comprising $TiB_2$ as the main component and hexagonal BN or AlN as the secondary component, or a sintered material comprising BN as the main component and $TiB_2$ or $ZrB_2$ as the secondary component, is useful particularly in a non-oxidizing atmosphere for molten metal crucibles or vacuum evaporation heaters. However, with such a mixture containing hardly sinterable BN as in the above instances, it is hardly possible to attain adequate densification or oxidation resistance, and the resulting product will be unsuitable for use in air.

Thus, $ZrB_2$ composite materials have not been practically used except for a very limited area, in spite of their excellent properties.

The present inventors have conducted extensive researches to overcome such problems with respect to the conventional $ZrB_2$ composite materials, and as a result, have succeeded in developing a sintered material which satisfies the requirements for various properties such as high density, high strength, oxidation resistance, corrosion resistance and thermal shock resistance, wherein some of the properties have been substantially improved. Further, they have succeeded in imparting excellent electric conductivity to such a sintered material.

Namely, the present invention provides a $ZrB_2$ composite sintered material consisting essentially of at least 1% by weight of SiC, at least 1% by weight of $B_4C$, at most 15% by weight of TiC, at most 35% by weight of TiN, at most 40% by weight of AlN, the rest being substantially $ZrB_2$, provided that the total amount of SiC and $B_4C$ is from 2 to 50% by weight.

Basically, the present invention presents a $ZrB_2$ composite sintered material which contains at least 1% by weight of each of SiC (silicon carbide) and $B_4C$ (boron carbide) as the secondary components, the total amount thereof being from 2 to 50% by weight, and the rest being substantially or mostly $ZrB_2$ except for certain additives.

Now, the present invention will be described in detail with reference to the preferred embodiments.

In a first preferred embodiment, the total amount of SiC and $B_4C$ is from 10 to 50% by weight. In the total amount of SiC and $B_4C$, SiC constitutes from 10 to 60% by weight, whereas $B_4C$ constitutes from 90 to 40% by weight. In this embodiment, particularly preferred is a sintered material which contains from 3 to 15% by weight of SiC and from 5 to 30% by weight of $B_4C$.

In a second preferred embodiment, the sintered material contains from 3 to 15% by weight of TiN (titanium nitride), from 3 to 25% by weight of $B_4C$, and from 3 to 30% by weight of SiC. In this embodiment, the total amount of TiN, $B_4C$ and SiC is particularly preferably within a range of from 10 to 50% by weight.

In another preferred embodiment, the sintered material contains from 3 to 25% by weight of TiC (titanium carbide), from 3 to 30% by weight of $B_4C$ and from 1 to 15% by weight of SiC. In this embodiment, the total amount of TiC, $B_4C$ and SiC is particularly preferably within a range of from 15 to 50% by weight.

In a further preferred embodiment, the sintered material contains from 3 to 40% by weight of AlN (aluminum nitride), from 5 to 20% by weight of $B_4C$ and from 1 to 15% by weight of SiC. In this embodiment, the total amount of AlN, $B_4C$ and SiC is from 15 to 50% by weight.

$ZrB_2$ to be used in the present invention can obtained, for example, by reacting a mixture of zirconium oxide, boron oxide and carbon at a high temperature. For the production of the sintered material of the present invention, it is desirable to employ the one having a purity as high as possible. Likewise, the particle size of the powder is preferably as small as possible. Specifically, the purity is preferably at least 99%, and the mean particle size is preferably at most 10 μm, more preferably at most 5 μm.

With respect to SiC, $B_4C$, AlN, TiC and TiN which are present as secondary components, it is required only that the respective specified amounts be present in the sintered material. Therefore, they may be incorporated in any forms as the starting materials. However, when starting materials other than in the form of SiC, $B_4C$, TiN, TiC and AlN are used, special care is required for the sintering step. Therefore, it is expedient to prepare the starting materials in the form of SiC, $B_4C$, TiN, TiC and AlN. Starting materials such as SiC, $B_4C$, TiN, TiC and AlN are also preferably as pure as possible, and usually preferably have a purity of at least 99%.

The starting material mixture is prepared usually by uniformly mixing fine powders of the three or four starting materials and the same will apply when ultra fine pulverization is employed for the purpose of pulverization and mixing. Generally, the particle size of the starting material mixture is preferably at most 10 μm, and more preferably, the mixture is adequately prepared to have a mean particle size of at most 1 μm.

The sintered material of the present invention is obtainable either by filling the mixture of the starting materials in a mold of e.g. graphite and subjecting it to pressure-less sintering or hot pressing in vacuum or in an inert or reducing atmosphere such as argon, helium or carbon monoxide, or by molding the above mixture by a rubber press mold, followed by pressure-less sintering.

The hot pressing is suitably conducted under a pressure of from 50 to 2000 kg/cm².

The sintering temperature may vary depending upon e.g. the types and proportions of the secondary components, but is usually from 1600° to 2300° C. The sintering time is usually from 0.5 to 5 hours.

Further, the sintering temperature is preferably from 800° to 2300° C. when AlN is incorporated as a secondary component, and from 1700° to 2200° C. when TiC or TiN is incorporated as a secondary component.

The proportion of the secondary components in the sintered material of the present invention is from 2 to 50% by weight, and the rest is substantially $ZrB_2$ as the main component. However, this main component $ZrB_2$ may partially be replaced by other component such as $TiB_2$ in a small amount not to impair the characteristics of $ZrB_2$.

$B_4C$ and SiC as secondary components are required to be at least 1% by weight, respectively. If $B_4C$ is less than 1% by weight, it is difficult to attain adequate densification, and the required properties such as oxidation resistance and high corrosion resistance can not adequately be attained. On the other hand, if SiC is less than 1% by weight, the oxidation resistance will be inadequate, and it will be difficult to attain desired densification.

It is not clearly understood why the presence of SiC brings about the improvement of the oxidation resistance of the sintered material of the present invention. However, it is considered that such an improvment is attributable to the formation of a highly viscous $B_2O_3$-$SiO_2$ surface layer by the combination with $B_4C$ during the use. This indicates that the sintered material of the present invention is adequately durable for use as heating elements.

While each of $B_4C$ and SiC may be present in an amount about a half of the sintered material, if $B_4C$ exceeds 50% by weight, the oxidation resistance tends to decrease, and if SiC exceeds 50% by weight, the thermal shock resistance or the corrosion resistance tends to be hardly obtainable, and in each case, the desirable properties of $ZrB_2$ will be impaired including the deterioration of the heat resistance. Therefore, the total amount of $B_4C$ and SiC should be not more than 50% by weight.

SiC is preferably from 1 to 15% by weight, more preferably from 3 to 15% in many cases. Within these ranges, each of SiC and $B_4C$ is preferably at least 5% by weight, and the preferred range of the total amount of SiC and $B_4C$ is at least 10% by weight, more preferably 20% by weight. With respect to the proportions of SiC and $B_4C$, in the total amount of the two materials, SiC preferably constitutes from 10 to 60% by weight, and $B_4C$ preferably constitutes from 90 to 40% by weight.

Further, other secondary components may be incorporated to such an extent not to substantially impair the object and effects of the sintered material of the present invention. However, it is desirable to minimize the amounts of such other components including unavoidable impurities.

However, there are some secondary components, which are preferably be incorporated. Typical examples of such desirable secondary components are TiC, TiN and AlN.

In the case where TiN is incorporated as a secondary component, each of TiN, $B_4C$ and SiC is required to be at least 1% by weight as the secondary component. If the TiN is less than 1% by weight, no adequate effects for the high corrosion resistance are obtainable, if $B_4C$ is less than 1% by weight, it becomes difficult to attain adequate densification, and if SiC is less than 1% by weight, the oxidation resistance will be inadequate.

If the total amount of TiN, $B_4C$ and SiC as secondary components, is too small, the corrosion resistance against iron or slag, or the oxidation resistance will be inadequate, or it becomes difficult to obtain a high density sintered material. The total amount should be at least 10% by weight.

On the other hand, each of TiN, $B_4C$ and SiC may be present in an amount of up to about a half of the sintered material. However, if TiN exceeds about 50% by weight, the oxidation resistance tends to decrease, if $B_4C$ exceeds about 50% by weight, the heat resistance and corrosion resistance tend to be poor, and if SiC exceeds about 50% by weight, no adequate thermal shock resistance will be obtained. Therefore, the total amount of TiN, $B_4C$ and SiC should better be not higher than 50% by weight in order to avoid the deterioration of the desired properties of the $ZrB_2$ base material.

Within these ranges, each of TiN, $B_4C$ and SiC is preferably at least 3% by weight, and the total amount is at least 10% by weight, more preferably at least 20% by weight and at most 40% by weight.

The preferred ranges of the respective secondary components are such that TiN is from 3 to 15% by weight, $B_4C$ is from 3 to 25% by weight, and SiC is from 3 to 30% by weight.

Now, in the case where TiC is incorporated, it is required to be at least 3% by weight. If the amount of TiC is less than 3% by weight, a high density sintered material is hardly obtainable, and even if it is used in combination with $B_4C$, no adequate strength will be obtained. On the other hand, if the amount is excessive, the desired properties such as the corrosion resistance or the oxidation resistance will be impaired. Particularly, in order to accomplish the object for the improvement of the oxidation resistance by the combination with $B_4C$, the maximum amount of TiC should be 35% by weight, and the amount is preferably from 5 to 20% by weight.

In this case, $B_4C$ is at least 3% by weight. If $B_4C$ is less than 3% by weight, no adequate improvement in the strength for the composition of this type will be attained, or no adequate improvement of the oxidation resistance will be attained. On the other hand, if the amount is excessive, the corrosion resistance or the heat resistance tends to deteriorate. Accordingly, the maximum amount should be 30% by weight and the amount is preferably from 5 to 20% by weight.

In the case where TiC is incorporated as a secondary component, SiC is used in an amount of from 3 to 15% by weight, preferably from 3 to 10% by weight.

The total amount of SiC, TiC and $B_4C$ should be at least 7%, preferably at least 15% by weight. If the total amount of these secondary components is too small, the oxidation resistance will be inadequate, or it becomes difficult to obtain a highly dense sintered material, whereby no adequate strength will be obtained. On the other hand, if the total amount of these secondary components is excessive, the desired properties of the $ZrB_2$ will be impaired. Therefore, the maximum of the total amount should be 60% by weight, normally 50% by weight, preferably 40% by weight.

In the case where AlN is incorporated, it is used in an amount of at least 3% by weight. If the amount is less than 3%, the electric resistance will be so low that no adequate desired properties for electrical parts such as heating elements are obtainable. On the other hand, the maximum amount should be 40% by weight, since if the amount is excessive, the heat resistance tends to be too high to obtain the desired properties for the electrical parts such as heating elements. The amount is preferably from 5 to 30% by weight.

In the case where AlN is incorporated, SiC is used in an amount of from 1 to 15% by weight, preferably from 1 to 10% by weight.

Further, $B_4C$ is required to be at least 5% by weight. If the amount is less than 5% by weight, it becomes difficult to attain adequate densification. On the other hand, the maximum amount should be 20% by weight, since if the amount is excessive, the heat resistance tends to deteriorate, or the oxidation resistance tends to be poor. The amount is preferably from 7 to 15% by weight.

Further, the total amount of SiC, $B_4C$ and AlN is at least 9% by weight and at most 60% by weight. However, if the total amount is excessive, the desirable characteristics of $ZrB_2$ tend to be impaired. Therefore, the total amount is usually from 15 to 50% by weight.

The sintered material of the present invention has a dense structure in which $ZrB_2$ fine crystal grains having a mean grain size of a few micro meters (most of the grains being not larger than 10 $\mu$m, and many grains being not larger than 5 $\mu$m) are uniformly dispersed, and the secondary components are uniformly distributed around or between the $ZrB_2$ crystal grains.

The sintered material of the present invention thus obtained, has a high density, high strength and excellent oxidation resistance, and depending upon the particular purpose, it is further possible to impart such properties as high temperature corrosion resistance, electric conductivity or high hardness by the incorporation of certain specific components. Thus, it is useful for various applications wherein the desirable characteristics of the $ZrB_2$ sintered material are utilized, for instance, for high temperature structural parts, mechanical part materials, tools, high temperature corrosion resistance parts, electrical parts such as heating elements, crucibles, etc. Thus, the industrial value of the present invention is significant.

Now, the present invention will be described in further detail with reference to Examples. However, it should be understood that the present invention is by no means restricted to these specific Examples.

In the examples, "%" means "% by weight", and "parts" means "parts by weight".

EXAMPLE 1

In order to adequately pulverize and mix 85 parts of $ZrB_2$ powder (purity: at least 99%), 10 parts of $B_4C$ powder (purity: 99%) and 5 parts of SiC powder (purity: 99%), the mixture was pulverized and mixed for three days by means of a pot mill and by using ethanol solvent and SiC balls. The powder thereby obtained was, after the removal of the alcohol by an evaporator, sufficiently dried to obtain a powder having a mean particle size of 0.15 $\mu$m. This powder was filled in a graphite mold and heated at 2000° C. under a pressure of 350 kg/cm² for 30 minutes in an argon atmosphere, to obtain a sintered material.

The sintered material thus obtained had a relative density of 98%, a bending strength of 78 kg/mm², no change in the oxidation resistance (Note 1) and a hardness HV (Note 2) of 2100 kg/mm². Most of the $ZrB_2$ grains in this sintered material had a grain size of at most 5 $\mu$m, and the analytical values were substantially the same as the composition of the starting material. (Inclusion of SiC from the SiC balls was about 2%.)

EXAMPLES 2 to 6 and 11 to 13 and COMPARATIVE EXAMPLES 1 to 3

Sintered materials were prepared in the same manner as in Example 1 except for the conditions identified in Table 1. The properties of the sintered materials are shown in Table 1.

EXAMPLES 7 to 10

Sintered materials were prepared in the same manner as in Example 1 except that the powder mixtures were molded under 2000 kg/cm² by rubber pressing, followed by sintering under the conditions specified in Table 1 (for 1 hour in an argon atmosphere). The properties of the sintered materials are shown in Table 1.

(The weight ratio of SiC in the sintered material in each Example is greater by about 2% than the weight ratio in the mixture of the starting materials, since certain SiC from the SiC balls was included. In Comparative Example 1, there was no such inclusion of SiC, since the mixing was conducted in a dry system without using SiC balls.)

Most of the $ZrB_2$ grains in this sintered material had a grain size of at most 5 μm, and the sintered material had a highly dense structure wherein TiN, $B_4C$ and SiC

TABLE 1

| | Amounts of starting materials (parts by weight) | | Sintering conditions | | Properties of sintered material** | | | |
|---|---|---|---|---|---|---|---|---|
| | $B_4C$ | SiC | Temp. (°C.) | Pressure (kg/cm$^2$) | Relative density (%) | Bending strength (kg/mm$^2$) | Hardness (Note 2) | Oxidation resistance (Note 1) |
| Example 2 | 5 | 5 | 2000 | 350 | 98 | 70 | 2000 | No change |
| Example 3 | 15 | 15 | 1800 | 350 | 99 | 91 | 2300 | " |
| Example 4 | 20 | 20 | 1800 | 350 | 99 | 105 | 2500 | " |
| Example 5 | 30 | 5 | 1800 | 350 | 99 | 83 | 2400 | " |
| Example 6 | 40 | 5 | 1800 | 350 | 99 | 90 | 2700 | " |
| Example 7 | 10 | 5 | 2100 | Pressure-less | 96 | 53 | 1900 | " |
| Example 8 | 30 | 5 | 2100 | " | 98 | 62 | 2300 | " |
| Example 9 | 15 | 15 | 2000 | " | 99 | 74 | 2000 | " |
| Example 10 | 20 | 20 | 2000 | " | 99 | 85 | 2200 | " |
| Example 11 | 20 | 2 | 1800 | 350 | 98 | 61 | 2200 | " |
| Example 12 | 2 | 10 | 2000 | 350 | 99 | 65 | 1900 | " |
| Example 13 | 15 | 15 | 1800 | 350 | 99 | 98 | 2800 | " |
| Comparative Example 1 | 10 | 0 | 2000 | 350 | 97 | 50 | 1900 | Oxidized and whitened |
| Comparative Example 2 | 0 | 10 | 2000 | 350 | 98 | 65 | 1700 | Oxidized and slightly whitened |
| Comparative Example 3 | 15 | 5 | 1800 | 350 | 97 | 45 | 2000 | Oxidized and slightly whitened |

*The rest (to make up the total of 100 parts by weight) of the composition other than identified in the Table is $ZrB_2$ and unavoidable impurities except for Examples 13 and Comparative Example 3. In Example 13, 5% by weight of $ZrB_2$ was substituted by $TiB_2$, and in Comparative Example 3, 10% by weight of $MoSi_2$ was further added.
**The proportions by weight of the components in the sintered material were substantially the same as the composition of the starting material mixture except that about 2% of SiC from the SiC balls was included. The sintered material obtained in each Example was highly dense, and most of the $ZrB_2$ grains had a grain size of at most 10 μm. (In Comparative Example 1, a mixture of $ZrB_2$ and $B_4C$ was pulverized and mixed in a dry system to have an average particle size of 10 μm. Therefore no SiC was included).
Note 1:
The oxidation resistance is represented by the outer appearance after the sintered material was held at 1300° C. for 12 hours in an electric furnace.
Note 2:
The hardness is the value of Micro Vickers hardness HV at room temperature as represented by kg/mm$^2$.

EXAMPLE 14

In order to adequately pulverize and mix 75 parts of $ZrB_2$ powder (purity: at least 99%), 10 parts of TiN powder (purity: 99%), 10 parts of $B_4C$ powder (purity: 99%) and 5 parts of SiC powder (purity: 99%), the mixture was pulverized and mixed for 3 days by means of a pot mill and by using ethanol solvent and SiC balls. The powder thereby obtained was, after the removal of the alcohol by an evaporator, sufficiently dried to obtain a powder having a mean particle size of 0.15 μm. This powder was filled in a graphite mold and heated in an argon atmosphere under a pressure of 350 kg/cm$^2$ at a temperature of 1900° C. for 30 minutes, to obtain a sintered material.

The sintered material thus obtained had a relative density of 98%, a bending strength of 72 kg/mm$^2$, no change in the oxidation resistance (Note 3), no corrosion against pure iron and slag (Note 4), and a hardness of 2100 kg/mm$^2$.

were strongly bonded around the $ZrB_2$ grains.

The properties of the sintered material thus obtained are shown in Table 2.

Note 3:
The oxidation resistance is the oxidized state when held in an oxidizing atmosphere at 1000° C. for 12 hours.

Note 4:
For the corrosion resistance, a sample was prepared to have a cubic of 1 cm$^3$, and embedded in pure iron or slag and treated at 1500° C. for 2 hours, whereupon the state of corrosion of the sample was determined on the basis of the thickness of the resulting altered zone. The corrosion was measured in an argon atmosphere.

EXAMPLES 15 to 19 and COMPARATIVE EXAMPLES 4 to 6

The predetermined mixtures of starting materials were prepared in accordance with Example 14, and treated under the predetermined sintering conditions, to obtain the respective sintered materials. The results are shown in Table 2.

TABLE 2

| | Sintering conditions | | Analytical values* (% by weight) | | | Properties of sintered material | | | | |
|---|---|---|---|---|---|---|---|---|---|---|
| | | | | | | Relative | Bending | | | Corrosion resistance | |
| | Temp. (°C.) | Pressure (kg/cm$^2$) | TiN | $B_4C$ | SiC | density (%) | strength (kg/mm$^2$) | Hardness (kg/mm$^2$) | Oxidation resistance | Pure iron | Slag |
| Example 14 | 1900 | 350 | 10 | 10 | 5 | 98 | 72 | 2100 | No change | No change | No change |
| Example 15 | 2000 | 350 | 10 | 5 | 10 | 99 | 68 | 2000 | " | " | " |
| Example 16 | 2100 | Pressure-less | 5 | 20 | 5 | 96 | 51 | 2000 | " | " | " |
| Example 17 | 2000 | 350 | 5 | 5 | 5 | 98 | 70 | 2050 | " | " | " |
| Example 18 | 2000 | 350 | 5 | 15 | 10 | 99 | 79 | 2250 | " | " | " |
| Example 19 | 2000 | 350 | 10 | 5 | 25 | 98 | 73 | 2100 | " | " | " |
| Comparative Example 4 | 1900 | 350 | 50 | 5 | 5 | 99 | 63 | 2100 | Oxidized and de- | 1 mm | " |

TABLE 2-continued

| | Sintering conditions | | Analytical values* (% by weight) | | | Properties of sintered material | | | | | |
| | Temp. (°C.) | Pressure (kg/cm²) | TiN | B$_4$C | SiC | Relative density (%) | Bending strength (kg/mm²) | Hardness (kg/mm²) | Oxidation resistance | Corrosion resistance Pure iron | Slag |
|---|---|---|---|---|---|---|---|---|---|---|---|
| Comparative Example 5 | 1900 | 350 | 5 | 45 | 5 | 99 | 59 | 2200 | Oxidized and decomposed | Corrosion | 6 mm |
| Comparative Example 6 | 1900 | 350 | 20 | 10 | 0 | 97 | 64 | 1900 | Oxidized and decomposed | No change | No change |

*The rest (to make up the total of 100% by weight) being ZrB$_2$ and unavoidable impurities.

EXAMPLE 20

In order to adequately pulverize and mix ZrB$_2$ powder (purity: at least 99%), TiC powder (purity: at least 99%), B$_4$C powder (purity: at least 99%) and SiC powder (purity: at least 99%), the mixture was pulverized and mixed for 3 days by means of a pot mill and by using ethanol solvent and SiC balls. The powder thereby obtained was, after the removal of the alcohol by an evaporator, sufficiently dried to obtain a powder having a mean size of 0.15 μm. This powder was filled in a graphite mold, and heated in an argon atmosphere under pressure at 2000° C. for 60 minutes, to obtain a sintered material.

The physical properties of the sintered material thus obtained are shown in Table 3.

This sintered material had a good structure, wherein fine ZrB$_2$ grains, most of which had a grain size of at most 5 μm, were uniformly distributed, and TiC, SiC and B$_4$C grains as secondary components were firmly bonded around the ZrB$_2$ grains. Thus, the sintered material had an extremely dense structure.

EXAMPLES 21 to 25, and COMPARATIVE EXAMPLES 7 to 10

The predetermined mixtures of starting materials were prepared in a manner substantially the same as in Example 20, and treated under the predetermined sintering conditions, to obtain sintered materials. The results are shown in Table 3.

EXAMPLE 26

In order to adequately pulverize and mix ZrB$_2$ powder (purity: at least 99%), B$_4$C powder (purity: at least 99%), AlN powder (purity: at least 99%) and SiC powder (purity: at least 99%), the mixture was pulverized and mixed for 3 days by means of a pot mill and by using ethanol solvent and SiC balls. The powder thereby obtained was, after the removal of the alcohol by an evaporator, sufficiently dried to obtain a powder having a mean particle size of 0.15 μm. This powder was molded under 2000 kg/cm² by means of a rubber press, and then subjected to pressure-less sintering at 2300° C. for 2 hours in an argon atmosphere. The properties of the sintered material thereby obtained are shown in Table 4.

EXAMPLE 28

The same ZrB$_2$ powder, SiC powder, B$_4$C powder and AlN powder as used in Example 26 were pulverized and mixed for 3 days by means of a pot mill and by using ethanol solvent and SiC balls.

The powder thereby obtained was, after the removal of the alcohol by an evaporator, sufficiently dried to obtain a powder having a mean particle size of 0.15 μm. This powder was filled in a graphite mold, and heated in an argon atmosphere under a pressure of 350 kg/cm² at a temperature of 2050° C. for 30 minutes. The properties of the sintered material thus obtained are shown in Table 4.

EXAMPLES 27 and 29 to 31, and COMPARATIVE EXAMPLES 11 to 14

The predetermined mixtures of starting materials were prepared in accordance with Examples 26 and 28, and treated under the predetermined sintering conditions, to obtain sintered materials. The results are shown in Table 4.

Note 1:

TABLE 3

| | Sintering conditions | | Analytical values* (% by weight) | | | Properties of sintered material | | | |
| | Temp. (°C.) | Pressure (kg/cm²) | TiC | B$_4$C | SiC | Relative density (%) | Bending strength (kg/mm²) | Micro Vickers hardness (kg/mm²) | Oxidation resistance (Note 3) |
|---|---|---|---|---|---|---|---|---|---|
| Example 20 | 2000 | 350 | 10 | 10 | 10 | 98 | 92 | 2200 | No change |
| Example 21 | 1900 | 350 | 5 | 15 | 5 | 99 | 87 | 2650 | " |
| Example 22 | 2000 | 350 | 10 | 5 | 15 | 98 | 90 | 2100 | " |
| Example 23 | 1950 | 350 | 15 | 10 | 5 | 99 | 97 | 2400 | " |
| Example 24 | 2200 | Pressure-less | 10 | 15 | 5 | 95 | 76 | 2150 | " |
| Example 25 | 2100 | " | 10 | 20 | 5 | 96 | 83 | 2450 | " |
| Comparative Example 7 | 2000 | 350 | 10 | 0 | 5 | 99 | 60 | 2000 | " |
| Comparative Example 8 | 2050 | 350 | 5 | 5 | 0 | 98 | 58 | 1900 | Slightly oxidized and decomposed |
| Comparative Example 9 | 2100 | Pressure-less | 5 | 5 | 20 | 94 | 43 | 1950 | No change |
| Comparative Example 10 | 2100 | " | 40 | 5 | 5 | 96 | 51 | 2000 | Oxidized and decomposed |

*The rest (to make up the total of 100% by weight) being ZrB$_2$ and unavoidable impurities.

The oxidation resistance is represented by the outer appearance when held in an oxygen atmosphere at 1300° C. for 12 hours.

Note 5:

The thermal shock resistance was determined by measuring the bending strength of the sample when the sample was heated to a predetermined temperature for 2 minutes in an electric furnace, and then rapidly cooled in water, and the thermal shock resistance is represented by the treating temperature (°C.) of the sample at which the strength was abruptly dropped.

Note 6:

The electric resistance is represented by a value measured by 4-point method, at 25° C.

TABLE 4

|  | Sintering conditions | | Analytical values of sintered material (%)* | | | Properties of sintered material | | | | |
|---|---|---|---|---|---|---|---|---|---|---|
|  | Temp. (°C.) | Pressure (kg/cm$^2$) | AlN | B$_4$C | SiC | Relative density (%) | Bending strength (kg/mm$^2$) | Oxidation resistance | Electric resistance (Ω cm) | Thermal shock resistance (°C.) |
| Example 26 | 23000 | Pressure-less | 5 | 15 | 5 | 93 | 41 | No change | 2.5 × 10$^{-5}$ | 550 |
| Example 27 | 2200 | " | 10 | 10 | 10 | 92 | 38 | " | 4.5 × 10$^{-4}$ | 650 |
| Example 28 | 2050 | 350 | 15 | 10 | 5 | 98 | 63 | " | 5.7 × 10$^{-3}$ | 700 |
| Example 29 | 2000 | 350 | 35 | 5 | 5 | 99 | 58 | " | 8.6 × 10$^{-1}$ | 800 |
| Example 30 | 1900 | 350 | 10 | 15 | 5 | 98 | 70 | " | 3.9 × 10$^{-4}$ | 700 |
| Example 31 | 2000 | 350 | 5 | 10 | 5 | 99 | 64 | " | 2.2 × 10$^{-4}$ | 600 |
| Comparative Example 11 | 1900 | 350 | 10 | 0 | 5 | 94 | 41 | " | 2.8 × 10$^{-5}$ | 300 |
| Comparative Example 12 | 1900 | 350 | 10 | 10 | 0 | 96 | 48 | Oxidized and decomposed | 4.2 × 10$^{-5}$ | 450 |
| Comparative Example 13 | 1900 | 350 | 45 | 5 | 5 | 97 | 46 | No change | 5.0 × 10$^{-7}$ | 400 |
| Comparative Example 14 | 2000 | 350 | 10 | 25 | 5 | 98 | 67 | Slightly oxidized and decomposed | 9.0 × 10$^{-3}$ | 350 |

*The rest (to make up the total of 100% by weight) being ZrB$_2$ and unavoidable impurities.

We claim:

1. A ZrB$_2$ composite sintered material consisting essentially of at least 1% by weight of SiC, at least 1% by weight of B$_4$C, and an additive selected from the group consisting of at most 15% by weight of TiC, at most 35% by weight of TiN, and at most 40% by weight of AlN, wherein the total of SiC, B$_4$C and said additive is at most 60% by weight when TiC and AlN is employed as said additive, and 50% by weight when TiN is employed as said additive, the rest being substantially ZrB$_2$, provided that the total amount of SiC and B$_4$C is from 2 to 50% by weight and in the total amount of SiC and B$_4$C, SiC constitutes from 10 to 60% by weight, and B$_4$C constitutes from 90 to 40% by weight.

2. The sintered material according to claim 1, wherein SiC is from 1 to 15% by weight.

3. The sintered material according to claim 2, wherein SiC is from 3 to 15% by weight.

4. The sintered material according to claim 3, wherein B$_4$C is at least 5% by weight.

5. The sintered material according to claim 4, wherein the total amount of SiC and B$_4$C is from 10 to 50% by weight.

6. The sintered material according to claim 5, wherein the total amount of SiC and B$_4$C is at least 20% by weight.

7. The sintered material according to claim 1, wherein TiN is from 3 to 15% by weight.

8. The sintered material according to claim 7, wherein TiN is from 3 to 15% by weight, B$_4$C is from 3 to 25% by weight, and SiC is from 3 to 30% by weight.

9. The sintered material according to claim 1, wherein the total amount of SiC, B$_4$C and TiN is from 10 to 50% by weight.

10. The sintered material according to claim 9, wherein the total amount of SiC, B$_4$C and TiN is from 20 to 40% by weight.

11. The sintered material according to claim 1, wherein TiC is from 3 to 35% by weight.

12. The sintered material according to claim 11, wherein TiC is from 3 to 35% by weight, B$_4$C is from 3 to 30% by weight and SiC is from 1 to 15% by weight.

13. The sintered material according to claim 12, wherein the total amount of TiC, B$_4$C and SiC is from 15 to 50% by weight.

14. The sintered material according to claim 13, wherein the total amount of TiC, B$_4$C and SiC is from 20 to 40% by weight.

15. The sintered material according to claim 1, wherein AlN is from 3 to 40% by weight.

16. The sintered material according to claim 15, wherein B$_4$C is from 5 to 20% by weight, and SiC is from 1 to 15% by weight.

17. The sintered material according to claim 16, wherein the total amount of AlN, B$_4$C and SiC is from 15 to 50% by weight.

18. The sintered material according to claim 17, wherein the total amount of AlN, B$_4$C and SiC is from 20 to 40% by weight.

* * * * *